UNITED STATES PATENT OFFICE 2,061,470

PRODUCTION OF METHANOL AND OTHER CARBON COMPOUNDS AND CATALYTIC AGENTS FOR USE THEREIN

Alfred T. Larson, Wilmington, Del., assignor to E. I. du Pont de Nemours & Company, Wilmington, Del., a corporation of Delaware No Drawing. Application November 16, 1933, Serial No. 698,315

9 Claims. (Cl. 260—156)

This invention relates to chemical reactions in the gaseous phase and particularly to the production of oxygenated hydrocarbons by catalysis from gaseous mixtures. The present application is a continuation in part of my copending application Serial No. 426,442, filed February 6, 1930, Pat. No. 1,939,708, Dec. 19, 1933 which is a division of application Ser. No. 202,165, filed June 28, 1927.

It is known that oxygenated hydrocarbons, and particularly methanol and its homologues, may be prepared synthetically by passing a gaseous mixture containing carbon monoxide and hydrogen under pressure over a catalyst. The synthesis depends upon reactions of which the following for methanol is characteristic:

$$CO + 2H_2 = CH_3OH$$

In my U. S. Patent No. 1,844,129 I have described a process for manufacturing oxygenated hydrocarbons and especially methanol, the process involving the use of catalysts prepared by fusing and subsequently reducing a mixture of copper oxide and manganese oxide.

It is the object of the present invention to provide a further improvement in the process described in the aforementioned patent.

Other objects and advantages will be apparent as the invention is better understood by reference to the following specification in which its preferred embodiments are described.

I have discovered that improved results may be obtained in carrying out reactions in the gaseous phase in the presence of a catalyst consisting of a reduction product of a fused mixture of copper oxide and manganese oxide, or copper oxide and zinc oxide, if there is incorporated in said catalysts one or more of the elements magnesium, aluminum, chromium, zirconium, vanadium, titanium, thorium, silicon and cerium.

The catalysts herein described exhibit an activity superior to that of a catalyst consisting of fused and reduced copper oxide and manganese oxide alone; and also superior to that of any of the foregoing list of elements taken singly or in combination with each other. The term "superior activity" is used to indicate that with a given rate of gas flow the catalysts give a higher yield of product per hour or, correspondingly, to attain a given hourly production a lower rate of gas flow may be maintained.

In carrying out the invention the prepared catalyst is disposed in a suitable receptacle adapted to withstand the pressure at which the reaction is conducted. The gaseous mixture is introduced at the proper temperature which may be regulated and maintained in any desired way. The gaseous mixture containing the product of the reaction is withdrawn and cooled to effect condensation of the product or is treated otherwise for the recovery thereof.

The catalysts are particularly well adapted for the synthesis of methanol from gaseous mixtures containing hydrogen and carbon monoxide. This reaction may be conducted with the described catalysts at various pressures and temperatures, but I prefer to carry out the synthesis of methanol at a pressure within the range of 400 to 1000 atmospheres and at a temperature of 250° to 500° C. The usefulness of the catalysts is not limited to the treatment of gaseous mixtures of any particular composition, it being possible to effect the synthesis of methanol, for example, with the improved catalysts by introducing gaseous mixtures containing hydrogen and carbon monoxide in which the proportion of the latter is relatively low, for example, between 3 and 15%. If the gaseous mixtures contain relatively higher proportions of carbon monoxide the reaction proceeds more vigorously, greater quantities of heat are evolved and corresponding provision must be made, therefore, for the dissipation of heat so that the catalysts may not be damaged by overheating and undesirable side reactions, such as methanation, may be avoided.

The following examples will serve to indicate the preferred procedure in preparing and utilizing catalysts such as are described herein, it being understood, however, that the invention is not limited to the details of operation or the particular conditions as set forth.

*Example 1.*—Prepare an intimate mixture of seventy-five parts by weight of pure cupric oxide, twenty parts of pure manganese dioxide and five parts of pure magnesium oxide. The mixture is fused, allowed to cool and crushed to suitable size. The crushed material is then reduced slowly at 150° to 350° C. and at atmospheric pressure in a current of pure hydrogen. Since the reduction process is exothermic it should be carried out slowly and with care so that the catalyst may not be damaged by excessive temperature. The catalyst thus prepared may be employed for the production of methanol by passing a gaseous mixture containing hydrogen and carbon monoxide in the volume ratio of twenty to one at a space velocity of 100,000 to 150,000, a pressure of 900 atmospheres and while maintaining a temperature within the range of 250° to 400° C. The principal product is methanol, which is associated with some of its higher homologues.

The following examples indicate the preferred proportions for preparing other catalysts included within the scope of the invention. These may be prepared and employed in the synthesis of methanol under the same conditions as are set forth in Example 1.

*Example 2.*—Eighty parts of pure cupric oxide, fifteen parts of pure manganese dioxide and five parts of pure chromic oxide.

*Example 3.*—Eighty-seven parts of pure cupric oxide, ten parts of pure manganese dioxide and three parts of pure aluminum oxide.

*Example 4.*—Eighty-two parts of pure cupric oxide, fifteen parts of pure manganese dioxide and three parts of pure zirconium oxide.

*Example 5.*—Eighty-five parts of pure cupric oxide, ten parts of pure manganese dioxide and five parts of pure vanadium oxide.

*Example 6.*—Eighty-seven parts of pure cupric oxide, ten parts of pure manganese dioxide and three parts pure titanium oxide.

*Example 7.*—Seventy-eight parts of pure cupric oxide, twenty parts of pure manganese dioxide and two parts of pure thorium oxide.

*Example 8.*—Seventy-five parts of pure cupric oxide, twenty parts of pure manganese dioxide and five parts of pure silica.

*Example 9.*—Seventy-nine parts of pure cupric oxide, twenty parts of pure manganese dioxide and one part of pure cerium oxide.

*Example 10.*—Eighty-seven parts of pure copper oxide, ten parts of pure zinc oxide, and three parts of aluminum oxide.

*Example 11.*—Eighty-five parts of copper oxide, ten parts of zinc oxide, and five parts of vanadium oxide.

*Example 12.*—Eighty parts copper oxide, fifteen parts manganese oxide, 2.5 parts magnesium oxide, and 2.5 parts chromium oxide.

*Example 13.*—Seventy-five parts copper oxide, twenty parts of manganese oxide, 2.5 parts magnesium oxide, and 2.5 parts vanadium oxide.

The catalysts described may be used in the synthesis of methanol and other oxygenated hydrocarbons and for conducting other reactions in the gaseous phase in a similar manner under conditions of pressure and temperature that may vary within a wide range, depending upon the particular nature of the desired reaction and of the product to be prepared. A catalyst containing two or more of the elements mentioned in combination with copper and manganese can be prepared similarly by combining the oxides of these elements. Such catalysts have the desirable characteristics hereinbefore mentioned and may be utilized in effecting various reactions in the gaseous phase including the production of oxygenated hydrocarbons such as methanol.

It is to be understood that while the gaseous mixtures employed need not be limited to those containing hydrogen and carbon monoxide exclusively, the gases should, nevertheless, be freed from impurities which are likely to deleteriously affect the catalyst, and of these the compounds of sulphur are the most commonly encountered. The sulphur compounds may be removed preliminarily from the gases by suitable treatment thereof in accordance with the well understood practice. In synthesizing methanol and the like, it is recommended that suitable precautions be taken for avoiding the presence of metals of the iron group (iron, nickel, and cobalt) in the catalyst and in the gases that are to react.

I have no theory or explanation to offer for any changes which may occur in the composition of the catalysts during either their reduction or actual use. It may be that in some cases the reduction yields a lower and especially active oxide which in conjunction with the activated copper with which it is associated forms a mass peculiarly adapted for the catalytic production of oxygenated hydrocarbons. In any event, it is to be understood that the term catalyst as employed in the claims includes the contact mass in the form in which it may occur during its use.

It will be apparent from the foregoing that by providing new catalysts of superior activity and improved physical form, decreasing catalyst consumption and improving smoothness of operation, and by thus facilitating the production of oxygenated hydrocarbons and other desirable products of synthetic and other reactions, the present invention represents a distinct advance in the art. While the invention has been described more particularly with reference to the synthesis of methanol, the improved catalysts and the process may be utilized with similar advantages in conducting other reactions in the gaseous phase.

The various details of apparatus and procedure may be modified to meet the particular conditions of the reaction, the products being recovered in any suitable or desirable way, it being possible in the synthesis of methanol, for example, at pressures above 200 atmospheres to practically completely condense methanol from the gases by cooling with water at ordinary temperature. The methanol can be separated otherwise and other products can be treated in the manner best adapted to effect the separation thereof in an economical and satisfactory way.

Various changes may be made in the details of operation hereinbefore described without departing from the invention or sacrificing any of the advantages thereof.

I claim:

1. The improved catalyst for reactions in the gaseous phase comprising the reduction product of a fused mixture containing from 1 to 5% of an oxide of an element of the group consisting of chromium, vanadium, zirconium, aluminum, magnesium, titanium, thorium, silicon and cerium, and from 97 to 95% of copper oxide, and manganese oxide, the copper oxide being in excess.

2. The improved catalyst for reactions in the gaseous phase comprising the reduction product of a fused mixture containing from 1 to 5% of an oxide of an element of the group consisting of chromium, vanadium, zirconium, aluminum, magnesium, titanium, thorium, silicon and cerium, and from 75 to 87% copper oxide and from 20 to 10% manganese oxide.

3. The improved catalyst for reactions in the gaseous phase comprising the reduction product of a fused mixture containing 80% copper oxide, 15% manganese oxide, and 5% chromium oxide.

4. The improved catalyst for reactions in the gaseous phase comprising the reduction product of a fused mixture containing 82% copper oxide, 15% manganese oxide, and 3% vanadium oxide.

5. The improved catalyst for reactions in the gaseous phase comprising the reduction product of a fused mixture containing 79% copper oxide, 20% manganese oxide, and 1% cerium oxide.

6. The process of synthesizing oxygenated organic compounds which comprises subjecting a gaseous mixture containing hydrogen and an oxide of carbon to a catalyst at an elevated temperature and pressure, said catalyst comprising the reduction product of a fused mixture containing from 1 to 5% of an oxide of an element of the group consisting of chromium, vanadium, zirconium, aluminum, magnesium, titanium, thorium, silicon, and cerium, and from 97 to 95% of copper oxide and manganese oxide, the copper oxide being in excess.

7. The process of synthesizing oxygenated organic compounds which comprises subjecting a gaseous mixture containing hydrogen and an oxide of carbon to a catalyst at an elevated temperature and pressure, said catalyst comprising the reduction product of a fused mixture containing from 1 to 5% of an oxide of an element of the group consisting of chromium, vanadium, zirconium, aluminum, magnesium, titanium, thorium, silicon, and cerium, and from 75 to 87% copper oxide and from 20 to 10% manganese oxide.

8. The process of synthesizing oxygenated organic compounds which comprises subjecting a gaseous mixture containing hydrogen and an oxide of carbon to a catalyst at an elevated temperature and pressure, said catalyst comprising the reduction product of a fused mixture containing 80% copper oxide, 15% manganese oxide and 5% chromium.

9. The process of synthesizing oxygenated organic compounds which comprises subjecting a gaseous mixture containing hydrogen and an oxide of carbon to a catalyst at an elevated temperature and pressure, said catalyst comprising the reduction product of a fused mixture containing 82% copper oxide, 15% manganese oxide and 3% vanadium oxide.

ALFRED T. LARSON.